United States Patent
Gaunt

(10) Patent No.: US 10,829,422 B2
(45) Date of Patent: *Nov. 10, 2020

(54) NUTRIENT RICH BIOLOGICALLY ACTIVE SOILS AND HORTICULTURE MEDIA WITH PREDETERMINED CHARACTERISTICS AND METHOD FOR MAKING

(71) Applicant: John Gaunt, Ithaca, NY (US)

(72) Inventor: John Gaunt, Ithaca, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/186,519

(22) Filed: Nov. 10, 2018

(65) Prior Publication Data

US 2019/0345076 A1    Nov. 14, 2019

Related U.S. Application Data

(63) Continuation of application No. 15/477,550, filed on Apr. 3, 2017, now Pat. No. 10,125,055.

(60) Provisional application No. 62/317,595, filed on Apr. 3, 2016, provisional application No. 62/322,586, filed on Apr. 14, 2016.

(51) Int. Cl.
| | | |
|---|---|---|
| *C05F 11/08* | (2006.01) | |
| *C05F 17/00* | (2020.01) | |
| *C05F 17/02* | (2006.01) | |
| *C05D 9/00* | (2006.01) | |
| *C05B 17/00* | (2006.01) | |
| *C05F 17/20* | (2020.01) | |
| *C05F 17/80* | (2020.01) | |
| *C05F 17/971* | (2020.01) | |
| *C05F 17/979* | (2020.01) | |

(52) U.S. Cl.
CPC .............. *C05F 17/20* (2020.01); *C05B 17/00* (2013.01); *C05D 9/00* (2013.01); *C05F 11/08* (2013.01); *C05F 17/00* (2013.01); *C05F 17/80* (2020.01); *C05F 17/971* (2020.01); *C05F 17/979* (2020.01); *Y02P 20/145* (2015.11); *Y02W 30/43* (2015.05); *Y02W 30/47* (2015.05)

(58) Field of Classification Search
CPC .............................. C05F 17/0036; C05D 9/00
See application file for complete search history.

(56) References Cited

U.S. PATENT DOCUMENTS

| | | | | |
|---|---|---|---|---|
| 10,125,055 B2* | 11/2018 | Gaunt | ................ | C05F 17/0036 |
| 2015/0259259 A1* | 9/2015 | Bhalla | ...................... | C05F 3/00 71/9 |

* cited by examiner

*Primary Examiner* — Wayne A Langel
(74) *Attorney, Agent, or Firm* — Randall L. Reed; Miller Mayer LLP

(57) ABSTRACT

A process is disclosed for creating biologically active soil or horticulture media for growing plants, wherein a fibrous carbon source such as coconut coir in a predetermined particulate form is mixed with fertilizers and other biological nutrients, inoculated with a biologically active substance such as worm castings and then aged or cured in an oxygen rich aerobic process. After which additional nutrients can be added to tailor the aged media for a specific use. Various apparatus with which to conduct the aging process are also described. In a variation of the process used soil or horticulture media is recharged by first composting at a high temperature to remove harmful and unwanted items, its contents are evaluated, nutrients are added, and it is then aged in an aerobic process.

17 Claims, 8 Drawing Sheets

NUTRIENT RICH BIOLOGICALLY ACTIVE SOILS AND HORTICULTURE MEDIA WITH PREDETERMINED CHARACTERISTICS AND METHOD FOR MAKING

CROSS-REFERENCE TO RELATED APPLICATIONS

This application claims the benefit of priority under relevant US law of U.S. Provisional Application Ser. No. 62/317,595 for "Method for Creating Nutrient Rich Biologically Active Soils and Horticulture Media with Predetermined Characteristics" filed on Apr. 3, 2016, Provisional Application Ser. No. 62/322,586 for "Method for Creating Nutrient Rich Biologically Active Soils and Horticulture Media with Predetermined Characteristics" filed on Apr. 14, 2016, U.S. patent application Ser. No. 15/477,550 for "Method for Creating Nutrient Rich Biologically Active Soils and Horticulture Media with Predetermined Characteristics" filed Apr. 3, 2017, the content of all the listed applications which is relied upon and incorporated herein by reference in its entirety.

FIELD OF INVENTION

The present invention relates to a system and method to create biologically active nutrient dense horticultural media with predetermined nutrient compositions and nutrient and water supply characteristics. More particularly it explains how to combine various substances and also process them to create the desired soil or horticulture media characteristics.

BACKGROUND OF INVENTION

A key aspect of growing plants and achieving desired growing characteristics and features of the plant is the characteristics of the soil it is grown in and the nutrients, water and biological environment that the growing plant experiences. Many plants are grown in artificial soils and horticultural practices involve cultivation in soilless media. Such media are referred to with terms such as "horticultural media", "potting soil", compost, soil or soilless media. Media may be derived from organic materials such as peat, coconut coir, wood products, compost, manures and inorganic materials such as sand, perlite, and vermiculite.

There have been many attempts to enhance and improve horticultural media to maximize growth and crop production characteristics. This can include adding, wetting agents, fertilizer nutrients, lime, gypsum, other chemicals, and biological inoculants.

Additionally, where a plant is grown to maturity in horticultural media (e.g. tomatoes, cannabis, strawberries, etc.) the costs of disposal of the used horticultural media can be significant. There is considerable interest in the potential to re-use horticulture media, but there are significant challenges and risks associated with re-use. There may be carryover of pests and diseases from one crop to the next and nutrients may become depleted or imbalanced affecting plant growth.

BRIEF SUMMARY OF THE INVENTION

The invention provides methods, devices and systems to create biologically active, nutrient dense horticultural media with pre-determined nutrient release of water supply characteristics and microbial populations.

One aspect of the invention involves using containers with air permeable surfaces to facilitate the flow of oxygen into the soil media during biological activation of horticultural medium. The oxygen supply can be actively augmented by using a system to actively inject oxygen into the horticultural medium or to mix the materials to expose surfaces and biological populations to oxygen.

The containers may be processed either as batches or as a continuous flow system.

Another aspect of the invention involves the use of diverse microbial populations stabilized as a living culture to activate the horticultural or soil media.

Another aspect involves the addition of materials to the horticulture or sail media that influence viability of microbial populations during periods of water stress.

Another aspect of the invention includes blending organic and inorganic nutrient sources in specific ratios into the horticultural or soil media to achieve desired nutrient supply characteristics. Other aspects of the invention involve the introduction of activated charcoal or biochar to influence the availability of nutrients.

Another aspect of the invention involves the introduction of activated charcoal or biochar to influence microbial activity and populations.

Another aspect of the invention involves manipulating the composition of the horticultural medium so as to affect the porosity of the medium and the water availability.

To achieve objectives of the invention it includes a method for creating biologically active nutrient dense plant growth media consisting of the steps of: a) forming a mixable base media with a specified porosity; b) mixing into the base media nutrients; c) activating the base media and nutrients by introducing biological inoculants to form an active media; d) aging the active media in an oxygen rich environment to thereby maintain biological aerobic activity; and e) blending in additional ingredients after the aging process is completed to thereby create a plant growth media tailored to desired nutrient and water supply characteristics.

In a further aspect it includes forming the mixable base media comprises hydrating coir of at least one particle size to create a loose mixable base. In another aspect of the invention step of forming the base further comprises varying a particle size of the mixable base media from less than 0.05 mm to more than 12.5 mm. In a further aspect of the invention the step of forming the mixable base media includes selecting and mixing one or more materials from a group consisting of coconut coir, sphagnum moss, pine bark, rice hulls, wood chips, sawdust, molasses, corn stover, wheat straw, barley straw, spent brewers grains, perilite, and, sand. In yet another aspect of the invention the step of mixing into the base media nutrients comprises introducing nitrogen, phosphorous, and potassium in a predetermined ratio to each other.

In yet a another aspect of the invention the step of mixing in nutrients includes mixing in one or more of substances taken from a group consisting of animal and plant derive protein meals, mineral trace elements, azomite, greensand, soluble humic and fulvic acids, poultry litter, diatomaceous earth, epsom salt (Mg SO4), gypsum (CaSO$_4$), humates, peanut meal, phosphate rock, soft rock phosphate, sodium nitrate, sulphate of potash, alfalfa meal, peanut meal, cottonseed meal, rye grass, neem meal, corn forage, green manures, clover, buckwheat, vetch, mustard, oil seed rape, kelp meal, feather meal, fish hydrolysate, blood meal, bone meal, bat and seabird guanos, langbenite, calcitic lime, dolomitic lime, ferrous sulfate, aluminum sulphate, and sulphur.

In yet another aspect of the invention, the step of aging the active media in an oxygen rich environment using a passive method of aeration. In a further aspect the step of using a passive method of aeration comprises a step of aging the active media in air permeable containers. In a further aspect of the step of aging the active media in air permeable containers involves use of air permeable containers made of air permeable fabric that is open at the top. In yet a further aspect of the invention, the step of aging the active media in an oxygen rich environment involves the step of relying on passive aeration when the temperature during the aging step remains in a range of between 70 to 130 degrees Fahrenheit for a period of 3 or more days before returning to ambient temperature.

In another aspect of the invention the step of aging in an oxygen rich environment involves the step of actively aerating the active media. In yet a further aspect of the invention the step of aging the active media in an oxygen rich environment involves the step of actively aerating when the temperature of the active media is 130 to 180 degrees Fahrenheit for a period of 3 days or more. In yet another aspect of the invention the step of actively aerating uses a step selected from the group including the killowing: inserting air conduits into the base and blowing air into the active media, turning of the active media using an auger within a vessel, turning the active media in windrows using a commercial windrow machine, turning of the active media in piles using equipment such as a front end loader, and turning the active media using a rotary composter.

In another aspect of the invention the step of introducing an inoculant is selected from a group including one or more of the following to activate the system: Introducing worm castings, introducing a predetermined amount of base previously made with this method, or introducing a predetermined amount of soil or introducing a consortia of biology including, bacteria, fungal populations and beneficial organisms.

In another aspect of the invention it includes a step of monitoring the oxygen content of the aging active media and injecting additional oxygen if the level monitored falls below a threshold necessary to maintain an aerobic aging process.

In yet another aspect of the invention the step of forming a base media with a specified porosity includes forming a base media with a combination of water porosity and air porosity. In yet another aspect the step of forming a base media with combination of water porosity and air porosity can include selecting it from a group consisting of a) 16% air porosity and 68% water porosity for a total of 84% porosity, b) 16% air porosity and 63% water porosity for a total of 79% porosity, and c) 31% air porosity and 58% water porosity for a total of 89% porosity. In a further aspect of this step water porosity can vary from 10% to 50% and air porosity can vary from 10% to 50% and total porosity can vary from 10% to 90% depending on the combination of air and water porosity.

In yet another aspect of the invention it includes a step of adding biochar as an ingredient.

The present invention also includes method for recharging used growth media for plant propagation includes the steps of: a) assessing the composition of used growth media for preselected physical, chemical and biological characteristics; b) composting the used growth media to obtain a temperature of at least 140° or more for a period of days to sterilize the growth media; c) adding base media as needed or desired; e) blending preselected nutrients into the growth media; f) activating the growth media by introducing at least one biological inoculant; g) aging the activated growth media in an oxygen rich environment to assure a purely aerobic aging process; and h) blending into the growth media additional nutrients and ingredients to thereby create a plant growth media tailored with desired nutrient and water supply characteristics. In yet another aspect of the invention the growth media being recharged is selected from a group consisting of horticulture media and soil media.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

I. Creation of Horticultural or Soil Media
a. Overview

Figure 1:
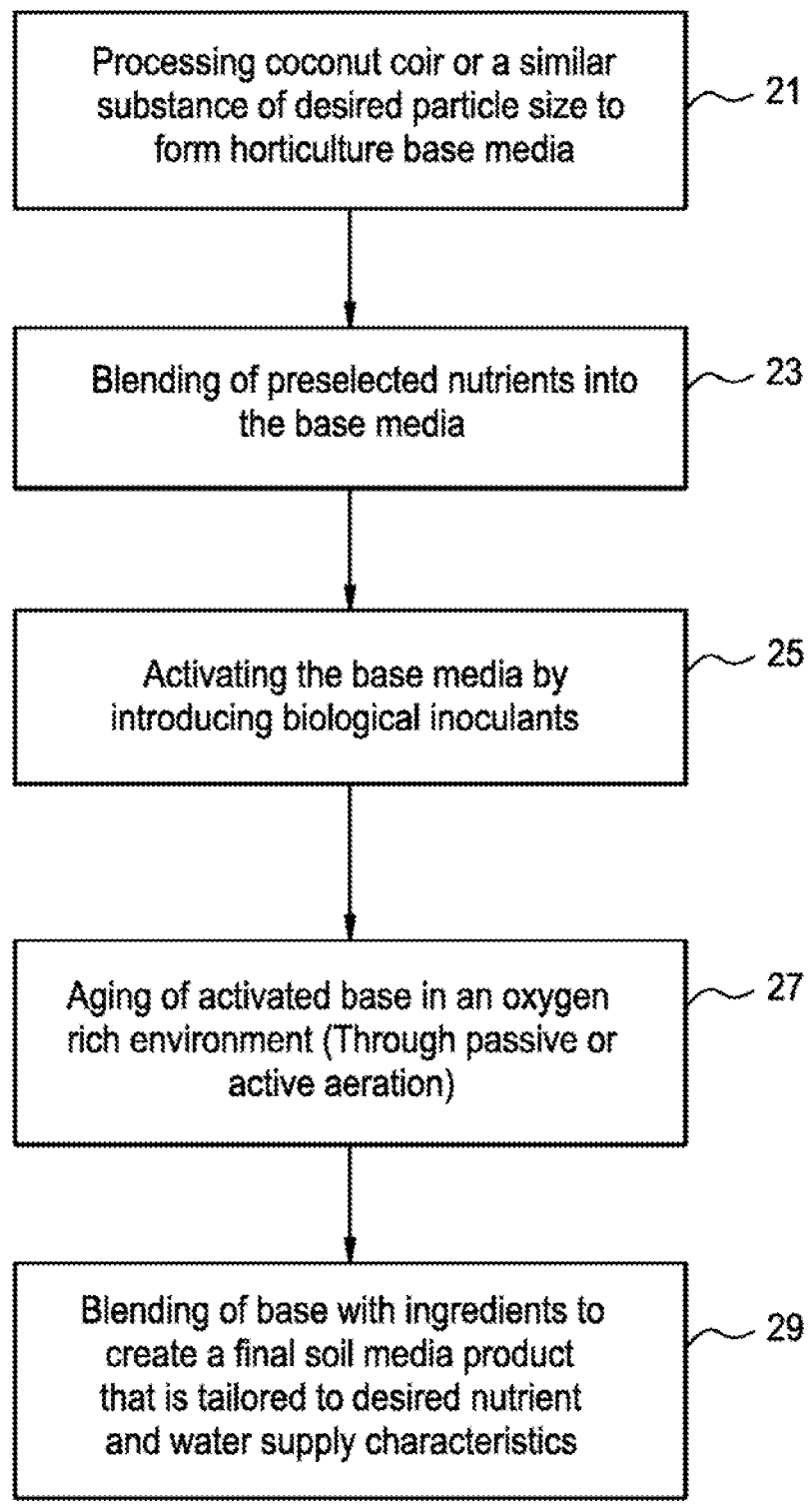
FIG. 1 is a flow chart that provides an overview of the steps of one method of the present invention used to create the desired soil or horticulture media.

The flow chart in FIG. 1 provides an overview of one process of the present invention. In the preferred embodiment in the initial step 21 coconut coir of specified particle size or sizes is hydrated and/or processed to create a base media for the horticulture media. Although coconut coir is the preferred base material other similar materials can be used to from the base media. The next step 23 involves mixing into the base various nutrients, such as fertilizer and other nutrients that will promote biological activity. In the next step 25 activation of the base with nutrients to create the active media begins with introduction of biological inoculants, such as worm castings or microbial cultures, the inoculant starts to react with the nutrients in the media and the oxygen rich environment provided through either passive or active means. During the fourth step 27 the aging process starts and an oxygen rich environment is maintained through either passive or active means to promote the aerobic aging or curing of the base. In the final step 29 additional ingredients are added to the base to produce a final horticulture growth media that has the desired water retention, nutrient and nutrient release characteristics. The order of the steps of this invention can be varied as needed or desired. The order in FIG. 1 is thus not necessary to practice the invention and is only presented in the order shown for the purpose of clearness and ease of discussing the method of the invention. Although the terms soil media and horticulture media have slightly different meaning they have been used interchangeably herein since the methods as described herein can be used to create both as a final product. At times they will be referred to collectively as growth media or plant growth media herein.

b. Preparing the Base Media

As noted with respect to the first step 21 in FIG. 1 the preferred horticulture base material is coconut coir. However, alternative materials could include any material or combination of materials with an appropriate carbon content and air space. Such other alternative horticulture base media include sphagnum moss, peat moss, pine bark, rice hulls, wood chips, corn stover, wheat straw, barley straw, spent brewers grains, perlite, and sand. The last two perlite and sand would need a carbon source. The coconut coir or other alternatives would naturally be shredded, ground or pulverized to create a flowable dry media of a specific particle size or sizes. As discussed in detail below the porosity of the particular base media used is significant for at least one of the systems used during the aging process. Although the discussion below uses coconut coir as the example any of the above alternatives would be processed or prepared in a similar fashion.

Coir is a natural fiber obtained from the husks of coconuts, the fibrous material located between the hard internal shell and the outer surface of the coconut. Coconut coir has a neural pH, has excellent water holding capacity, air space and is disease resistant. The present invention uses coir which has been milled to varying sizes depending on the application. Commercially available coir comes in compressed blocks in a powdered form where the coconut fibers have been ground down to a specific particle size.

As will be discussed in detail below one of the innovative features of the process described herein is that it maintains the biological aging or curing step as a wholly aerobic process. Assuring a sufficient oxygen supply to the media during the aging process is of paramount importance. One of the factors that can effect providing sufficient oxygen supply is the porosity of the media. Porosity of the horticulture growth media is also of concern with respect to the use it will be put to by the end use customer. Thus, at the beginning the porosity selected for the media will be driven by the needs of the aging or curing process, but upon completion will be adjusted for the needs of the customer that will be using the horticulture growth media.

The coir used is ground down into a specific particle size and then compressed into a dry block. Blocks of coir come dry compressed blocks with particle sizes that range from greater than 12.5 mm to less than 0.5 mm. The processing step commences with the selection of coir of one or more particle sizes. The coir can be processed either in a dry or wet state. Processing the dry compressed coir blocks in a dry state involves breaking apart the compressed blocks by mechanical means. An alternative is to hydrate the coir blocks as part of the processing. This may be done either by a static or dynamic means, an example of a static method is laying the blocks on a flat surface and then spraying water on them to hydrate them. As the blocks absorb water they break down. Once they have absorbed sufficient water to reach the desired state of hydration they can be easily broken up into their individual particle size. An alternative dynamic method of processing involves breaking the blocks up in a large mixer such as a horizontal forage mixer or cement mixer and adding water to achieve the desired level of hydration to create a dry bulk flowable mixture that is easy to work with and facilitates the mixing in of additional ingredients as desired and needed.

As noted previously, porosity of the horticulture media is also of concern with respect to the process of the invention described herein as well as the needs of the end consumer of the product. The porosity of the base media has two aspects water porosity and air porosity. The following table sets forth examples of porosity used in batches of base media made for the process of this invention:

| Soil | Air Porosity | Water Porosity | Total Porosity |
| --- | --- | --- | --- |
| Porosity 1 | 16% | 68% | 84% |
| Porosity 2 | 21% | 63% | 84% |
| Porosity 3 | 31% | 58% | 89% |

These are only examples and depending on the application and method of aeration and aging of the horticulture media used to achieve the final product, the water and air porosity can be significantly varied and the invention still practiced. A significant point to keep in mind is that varying the size or sizes of the particles of coir affects the water retention characteristics of the horticulture media being created as well as its air flow characteristics.

c. Adding Nutrients

The next step 23, FIG. 1, involves blending into the base media formed in step 21 various nutrients. The nutrients can vary significantly given the desired use of the horticulture or soil media being created. Typically, it would start with a base of fertilizer consisting of nitrogen, phosphorous and potassium (NPK). The formula for the combination for these three ingredients is given as ratio such as 4-2-3, 0-11-7, 2-4-4, etc. The numbers as is common knowledge in the industry indicate the proportionate amount of nitrogen, phosphorus and potassium in the fertilizer. The possible sources of nutrients in organic or inorganic forms and combinations of amounts of each of the ingredients in the NPK can vary greatly depending on the intended use of the horticulture media. The possible variations are too numerous to recite, but the uses of the possible different variations would be understandable to those skilled in the art.

In addition to the use of one or more of the NPK ingredients, those skilled in the art know of a plethora of additional secondary or tertiary micronutrients that can be added, again depending on the intended use of the final horticulture or soil media to be produced. Secondary micronutrients that might be added include: calcium (Ca), magnesium (Mg), and sulphur (S). Additional micronutrients that could be added include: copper (Cu), iron (Fe), manganese (Mn), molybdenum (Mo), zinc (Zn), boron (B), and of possible use here are silicon (Si), cobalt (Co), and vanadium (V plus rare mineral catalysts. In addition to the foregoing elements the following substances are often used as biological nutrients in soil or horticulture growth media: diatomaceous earth, feather meal, gypsum, humate, poultry litter, peanut meal, phosphate rock, and sulfate of potash. The list of possible additional nutrients that can also include: Azomite, bone meal, Soluble Humic and Fulvic acids, Poultry litter, Diatomaceous earth, epsom salt (Mg SO4), gypsum ($CaSO_4$), humates, peanut meal, phosphate rock, soluble Sulphate of Potash, alfalfa meal, peanut meal, cottonseed meal, kelp meal, feather meal and dolomitic lime.

Carbon sources may also be added in addition to that already in the base media. Such carbon sources can include but are not limited to the following: rice hulls, wood chips (various species of trees, brush and shrubs can provide the source), sawdust, coconut coir, molasses, corn stover, wheat straw, barley straw, spent brewers grains, glycerol.

An additional ingredient that can be added is biochar. Biochar differs from most of the ingredients listed above. Biochar is a solid generally of at least 60% carbon material created by heating organic matter in the absence, or reduced supply of oxygen. Equipment exists for the pyrolysis or gasification of biomass and artisanal systems can be devised to create biochar. The biomass sources for making biochar include such organic materials as animal manure, animal remains or bones, crop residue, root mass, natural vegetation and bio-solids, which are then subjected to a pyrolysis or gasification process. While the carbon in biochar is stable and can endure in soil for thousands of years it can enhance soil fertility, improve soil water use, retain organic and inorganic nutrients and increase soil water retention and resistance of a growing plant to water stress. Since biochar achieves the above but retains its structure it remains in the soil or horticulture media after use.

d. Activating the Base Media with Nutrients

In step 25, FIG. 1, the base is biologically activated by the addition of a biological inoculant or innoculants. One of the preferred inoculants is earth worm castings. Earth worm castings add beneficial fungi, bacteria and other microbes to the base media. The nature of the castings may also be influenced by the organic and inorganic materials fed to the worms that produce the castings and through inoculation with microbial innoculants. Also, biologically activated horticultural media containing a diverse microbial population may be used as an inoculant to introduce biological active agents such as fungi, bacteria and other organisms. One source of such a horticulture media is media produced by the invention process described herein. Alternatively a soil or combination of soil types could be selected for use.

The biological activity of the bacteria, fungi and other microbes produce heat, carbon dioxide and ammonium ($NH_4$) among other products as they grow. Available ammonium may be further converted into nitrates ($NO_3$) through the process of nitrification. Additionally, various fungi and other so called microbes grow in the media producing organic acids and metabolites that influence the physical, biological and chemical characteristics of media and also combine with the surfaces of biochar. These organic materials and their interactions contribute to and determine nutrient supply.

While this process may appear analogous to composting, it differs in a number of significant ways. The range and complexity of organic substrates being broken down differs. Target thermal parameters for process conditions may differ from those used in composting.

Composting focuses on, managing the air/water balance to maintaining high temperatures (135°-160° Fahrenheit/ 50°-70° Celsius) over a sufficient time anywhere from 3 days to 15 days, primarily to ensure pathogens, weed seeds and other undesirable items are destroyed or neutralized are killed due to the high temperatures. The high temperatures indicate a high degree of biological activity.

Control of pathogens and weed seeds is not the primary focus of the activation process. In the present invention all of the ingredients used are controlled and do not have pathogens, weed seeds or other undesirable items. Additionally, the objective of the activation and aging stages is to ensure that an adequate microbial population and the desired diversity in this population is established and stabilized in the horticultural media or soil media and to ensure the desired nutrient supply characteristics and performance.

As noted above the objective then entails creating a stable living soil or horticulture media wherein the nutrients will be broken down and made available over a period of time to vegetation planted in the media. Initially, the microbes, bacteria and fungi start to grow and multiply on the available carbon in the raw materials. As they begin multiply rapidly they use nutrients that are available to them. These nutrients may be immediately available in mineral form or released from the breakdown of organic materials. Given the abundance of this biological activity the temperature of the media rapidly rises indicating the tremendous biological activity taking place. The rising temperature indicates that the available oxygen is being used up.

Once the temperature passes 110° to 120° or so experience shows that there is a risk that oxygen supply may be exhausted and the process may turn anaerobic due to the lack of oxygen. Anaerobic processes can produce unwanted byproducts and kills the beneficial aerobic bacteria, fungi and microbes which the present invention encourages.

Sufficient supply of oxygen to maintain an aerobic process may be achieved in various ways. Passive supply of a sufficient air flow generally can be used when the volume of the aging container is sufficiently small volume. The rate of diffusion can be influenced by manipulation of the total, air and water filled porosity of the materials. Alternatives to passive aeration involve the injection of air or mechanical turning or mixing of the material.

When the temperatures range goes higher to 140° to 150° the base needs to be actively aerated. Active aeration such as the injection of air into the media during the aging process is the means used to provide sufficient oxygen to the bacteria, fungi and other beneficial microbes in the media.

e. Aging the Media

The next step 27, FIG. 1, is the aging or curing process. As detailed above of particular importance in the aging process of the present invention is that it provide sufficient oxygen to the media as it ages.

The aging process typically lasts for two or three weeks, but may take as little as 4 days. Additional curing may last for up to several months. During the aging process a key requirement as noted is that it proceeds as an aerobic process.

In the present invention as noted above the aging step must be maintained as an aerobic process. The intent is to create a living sustainable culture of aerobic bacteria, fungi and microbes. By maintaining the process as an aerobic one after the initial feeding frenzy the raw nutrients are used up and the temperature drops as the bacteria, fungi and microbes start feeding off of each other. After stabilization it reaches a steady state where bacteria, fungi and other microbes that are produced feed off of dead bacteria, fungi and other microbes as well as the added substrates in a cyclical process.

Figure 2:
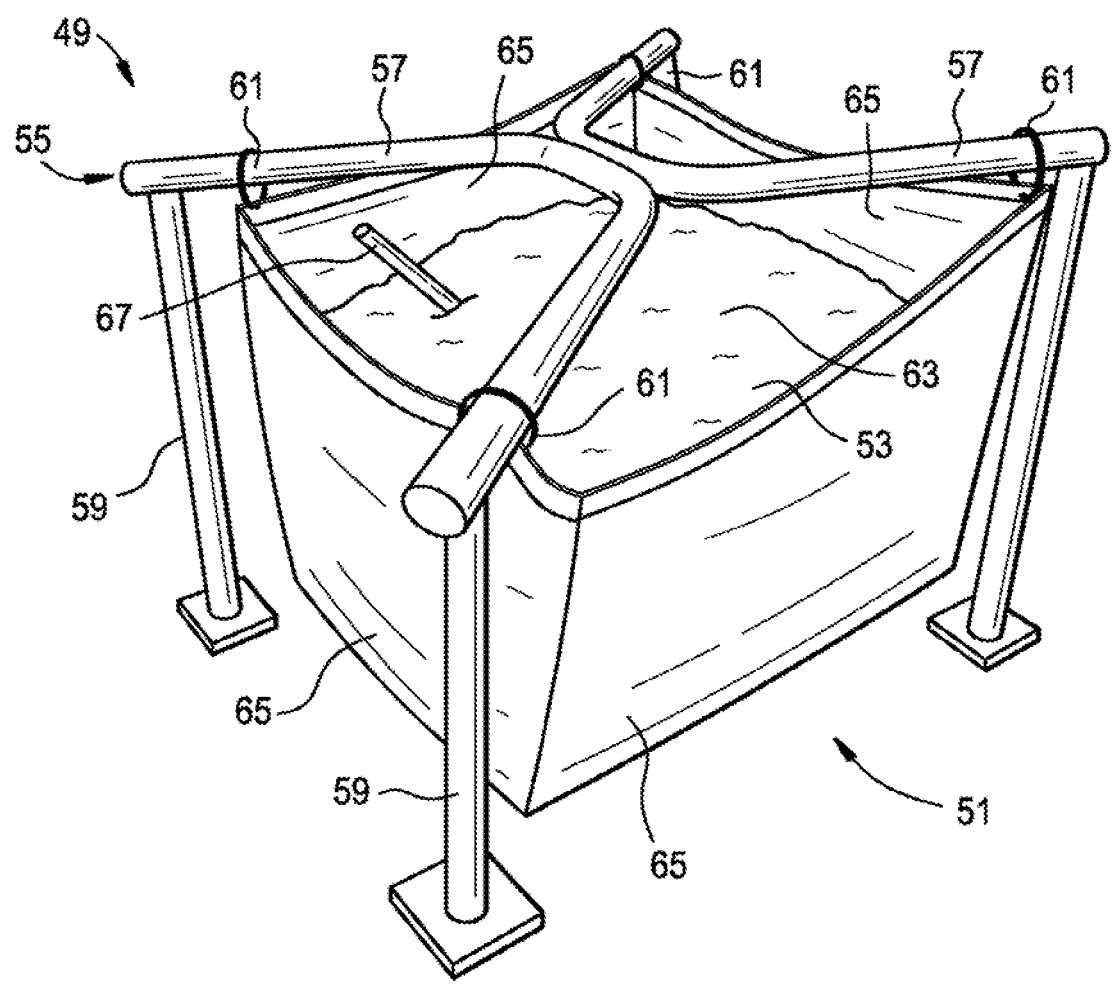
FIG. 2 is perspective view of a bin based aging system that uses a porous bag held by a frame to age the horticulture media.

Once activated the aging or curing process can be conducted in several different ways to achieve the desired outcome of the present invention. In one variation of the aging process of the present invention the soil media is placed in air permeable hoppers or bins which are approximately 1 meter square to provide a static aging process 49 FIG. 2. As can be seen in FIG. 2 the bins are fabric bags that are air permeable with an open top to allow the free flow of air. This generally provides sufficient air flow to keep the soil media sufficiently oxygenated to maintain an aerobic process, when the temperatures remain the 90° to 120° range this is the case. If the temperatures increase to the 140° to 150° range active processes to inject an air flow can be used. One method is to insert pipes into the soil media during the aging process and blow air into the soil media to assure sufficient oxygen levels to maintain the process as an aerobic process.

FIG. 2 is a perspective view of such a bin where bag 51 is open at its top 53. Bag 51 is held up and in place by frame 55. Frame 55 is metal tubing with an upper support portion 57 consisting of two metal tubes welded together along their center portion and struts or legs 59 welded to the end of the upper portion tubes 57. Bag 51 attaches by straps 61 to the upper frame formed by the tubing of upper support section 57. The aging horticulture media 63 in bag 51 fills it almost to its top. Bag 51 is made of a porous woven plastic strand or nylon type material that allows air to freely pass through the side 65 of bag 51 but retains the media. A thermometer or temperature probe 67 can be inserted into media 63 to monitor temperature.

Figure 3:
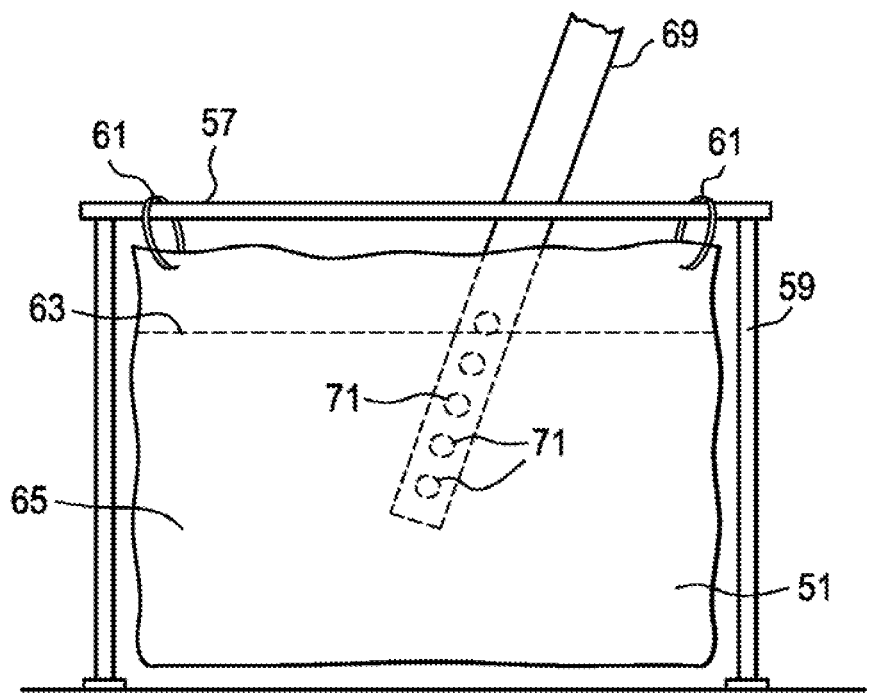
FIG. 3 is a side view of the aging bin depicted in FIG. 2 with an aeration conduit inserted into the horticulture media.

FIG. 3, a side view of the aging bin of the present invention shows the end of an aeration conduit 69 inserted into media 63. Conduit 69 might have apertures 71 in that portion of it buried in media 63 to facilitate the injection of air into the soil or horticulture media 63. Thus, if the temperature of the media during the aging process rises above 110° or so air can be injected into media 63 to assure the bacteria, fungi and microbes have an adequate oxygen supply to keep the process an aerobic one. Air can be injected into conduit 69 with a standard air blower unit or in any other number of standard ways.

In another variation of the aging process the soil media may be mixed within a vessel designed for either batch or continuous mixing using an auger or augers to mix the horticultural media to ensure that the materials are exposed to an adequate amount of oxygen and that moisture content is controlled.

Figure 4:
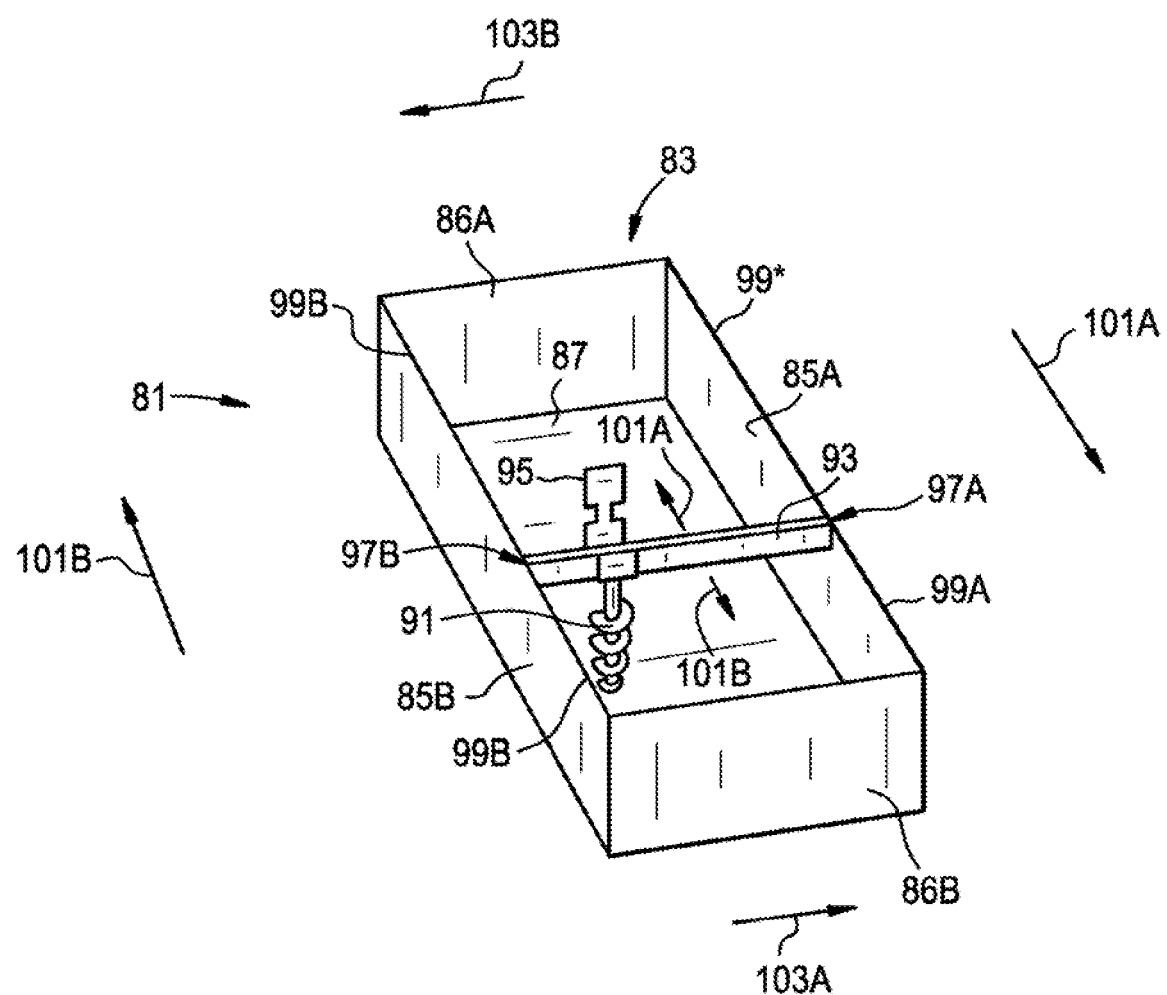
FIG. 4 is a perspective view of another system used to age the horticulture media that uses an auger designed to move about a bin and thus agitate and thereby aerate the soil or horticulture media during the aging process.
Figure 5:
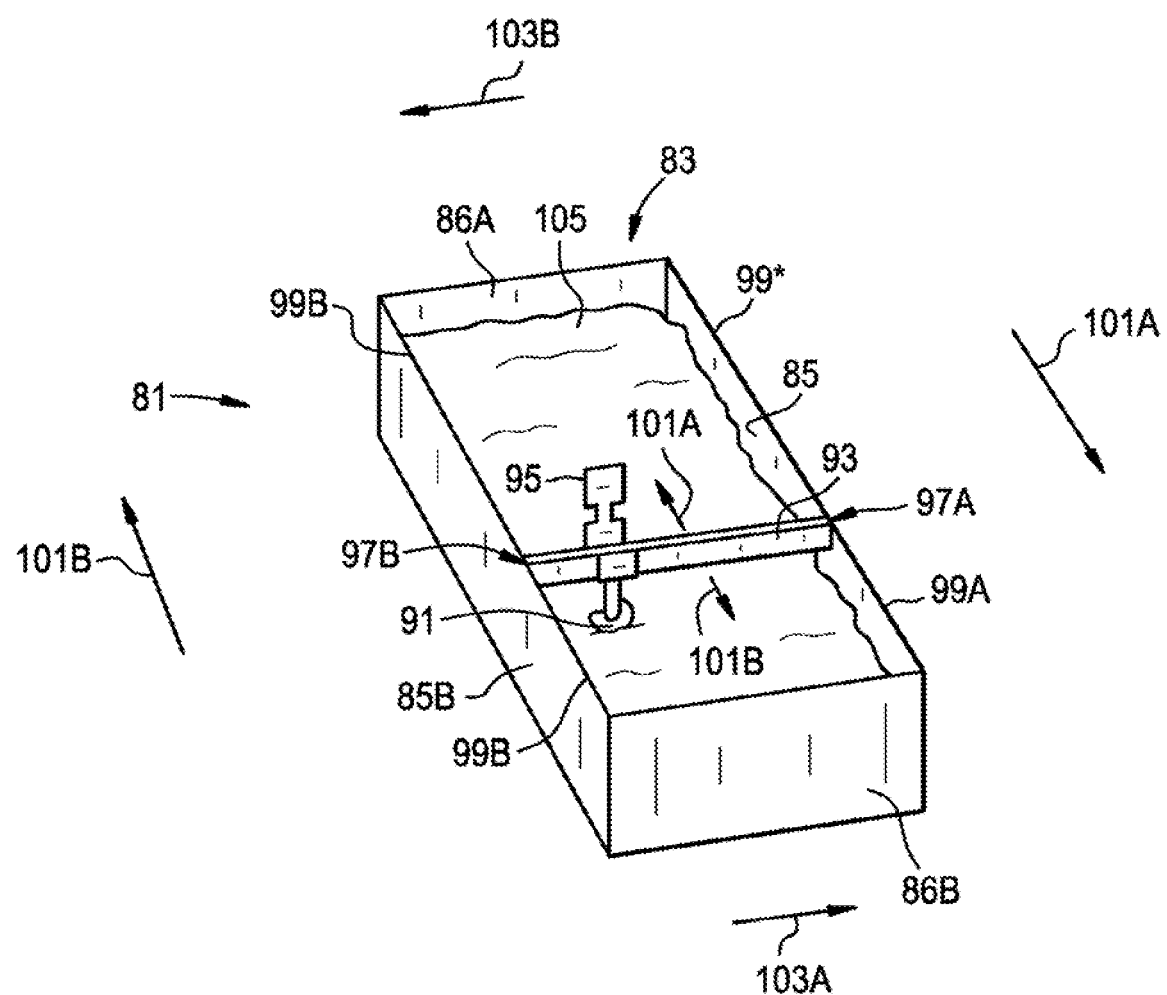
FIG. 5 depicts the auger/bin based system of FIG. 4 with the bin filled with horticulture media.

FIG. 4 depicts such an auger based system 81. The auger based system 81 consists of an aging vessel 83 which has sides 85A and 85B and ends 86A and 86B, a bottom 87 and an open top 89. Auger 91 attaches to bar 93 with motor 95 connects to the top of the auger. Bar 93 at each end 97A and 97B rests on rails 99A and 99B respectively. Bar 93 can move in direction 101A and 101B between ends 86A and 86B along rails 99A and 99B. Additionally, auger 91 can move along bar 93 in direction 103A and 103B between ends 97A and 97B of bar 93. Referring to FIG. 5, vessel 83 is now filled with soil or horticulture media 105 into which nutrients and biological inoculants 108 have been added. The system 81 which is controlled by an appropriately programmed computer or controller, not shown, moves auger 91 around the entire area of vessel 83 as auger 91 churns up media 105. Churning auger 91 moves at a pace such that soil or horticulture media 105 is adequately aerated to maintain the aging process as an aerobic one.

Figure 7:
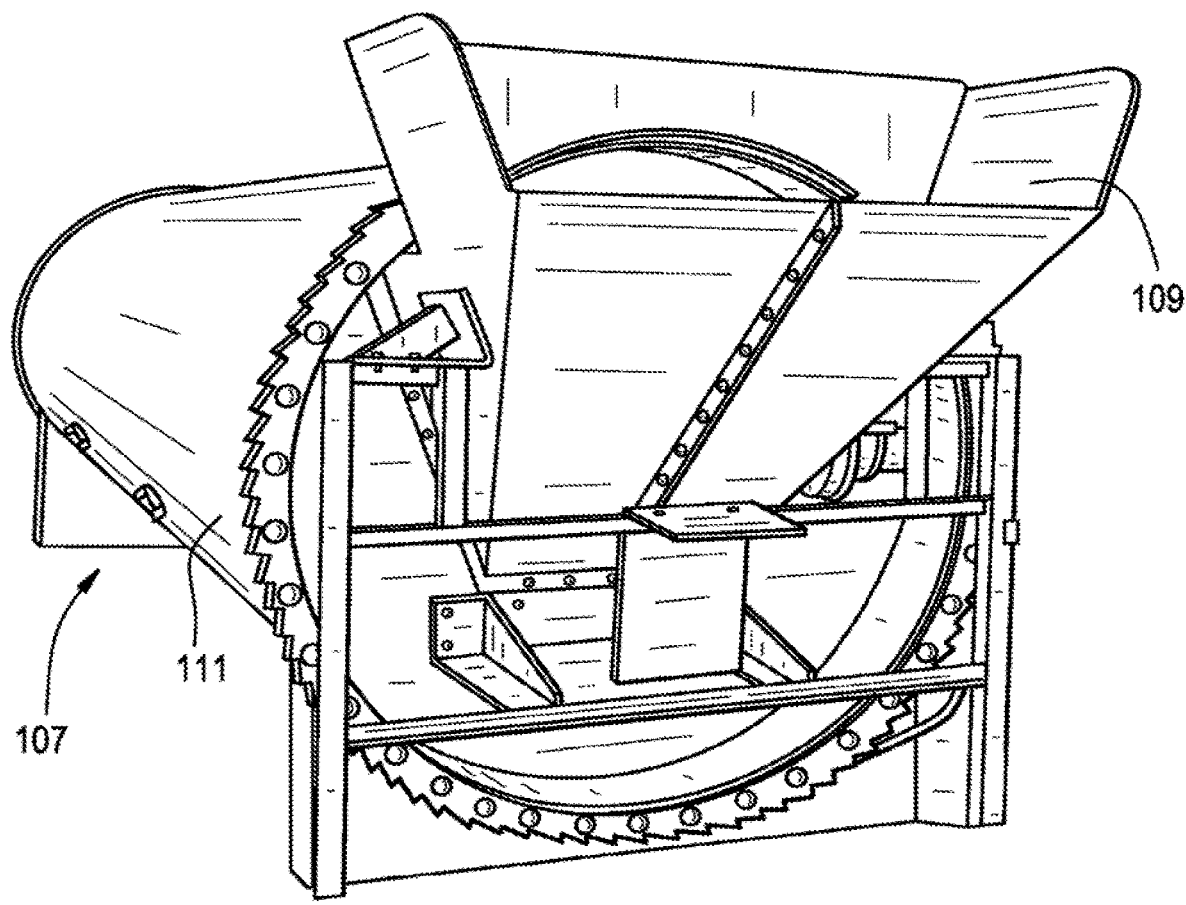
FIG. 7 a rotary composter that might be used with the present invention.

In another variation in rotary composting or processing equipment 107 FIG. 7 may be used to ensure that the growth media is exposed to adequate oxygen and that moisture content is controlled. In rotary composter 107 is driven by a motor which turns drum 111, which is a hollow cylinder. The growth media to be processed is loaded through chute 109. The rotary processing equipment includes a temperature sensor, air is introduced through the opening into the rotating drum 111. The rate of rotation of the drum and amount of air vented into the drum during operation would be a factor of the aeration of the growth media and temperature necessary to achieve the purely aerobic process and results discussed above to create the growth media of the present invention.

Figure 8:
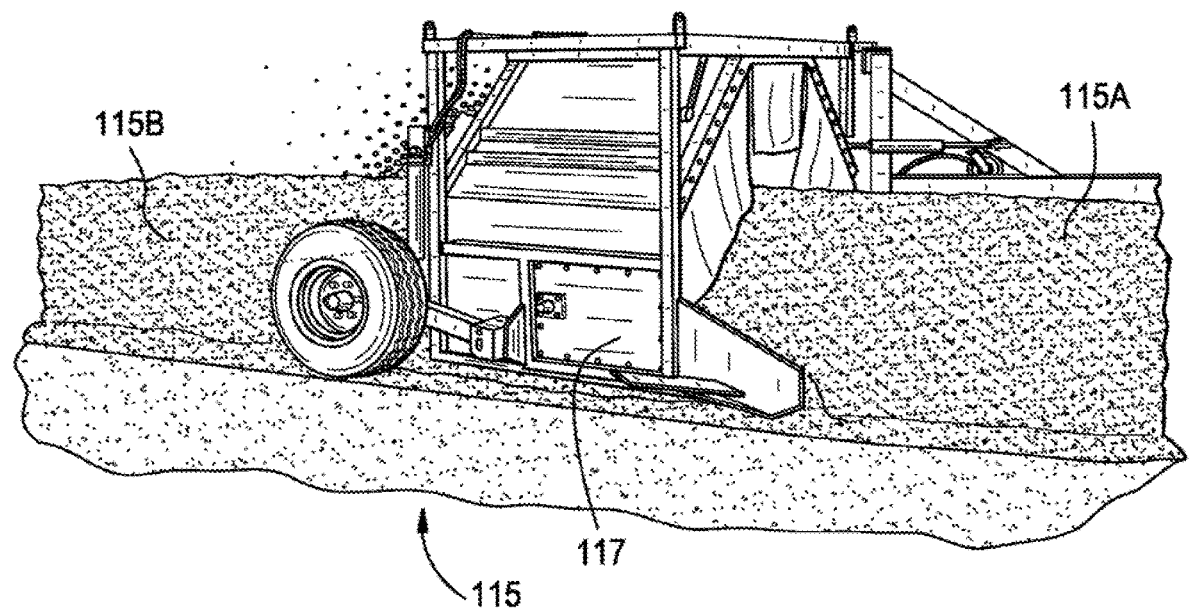
FIG. 8 a windrow system with a commercial windrow machine that would turn the active media to aerate it.

In another variation materials could be processed as windrows 115 FIG. 8 and turned by windrow turning equipment 117 or other equipment such as a standard front end loader not shown. As can be seen in FIG. 8 as windrow turner 117 moves down windrow 115, agitates and mixes the growth media in the portion of the row 115A and redeposits it in reformed the windrow 115B after having thoroughly mixed the growth media. The number of times this is done and the speed with which this is done is a factor of the aeration and temperature of the growth media necessary to achieve the purely aerobic process and results discussed above to create the growth media of the present invention.

Any number of techniques can be used to measure oxygen levels in the aging media and assuring that sufficient oxygen is supplied to the aging media to assure it is an aerobic process. Monitoring temperature with probe 67 FIG. 2 is one possibility as discussed above. You can also measure the oxygen levels by directly measuring the oxygen contact with an appropriate sensor. You can measure methane concentrations with an appropriate sensor. The production of methane being an indicator that the process is going anaerobic. A less sensitive but possible measure would be ratios of ammoniacal and nitrate forms of nitrogen. Ammonium is a precursor of nitrate. Ammonium can be produced under anaerobic conditions, but nitrate cannot. This last measure can also be used as an index of the maturity of the aging process.

f. Fine Tuning the Media

As noted, at some point during the process various ingredients are blended into the base or soil media to alter the ratio between the carbon available to the microbial population and nutrients required for the growth. Nutrients are added both to ensure adequate microbial growth and to adjust the nutrient supplying characteristic of the final soil media.

This step appears at 29 FIG. 1 for convenience of illustration, but it can be done at any desired point during the process described above. For example lime might be added to the soil media to change its pH. Biochar may also be added as needed or desired. In fact any of the nutrients listed or discussed above in section I. c. can be added to the soil or horticulture media to tailor the final soil or horticulture media to the intended use.

In an additional aspect of the invention mites are added to the soil media during or after the aging process to remove deleterious matter and keep the soil media in balance. Oribatid mite is a type of soil mite that is commonly found in wooded areas where it often assists in the breakdown of organic matter. The *Hypoaspis mite* is a small (0.5 mm) light brown mite that lives in the top ½ in layer of soil.

In addition to feeding on organic matter biological control can be used to control pests that may enter. For example fungus gnats are small flies known to infest horticultural media. Their larvae primarily feed on fungi and organic matter, but also chew roots and can be a problem in greenhouses, nurseries, potted plants and interior plantscapes. Biological control measures are effective to control fungus gnat populations. For example Nematodes such as *Steinernema* nematodes and *Bacillus thuringiensis* subspecies *israelensis* (Bti) used as a soil drench can all be used as natural predators of fungus gnat pupae.

As another example *Trichoderma* species such as *T. harzianum, T. viride* and *T. hamatum* can be added to the soil. *Trichoderma* are used to control fungal root diseases and their presence can be established in horticultural media.

Figure 6:
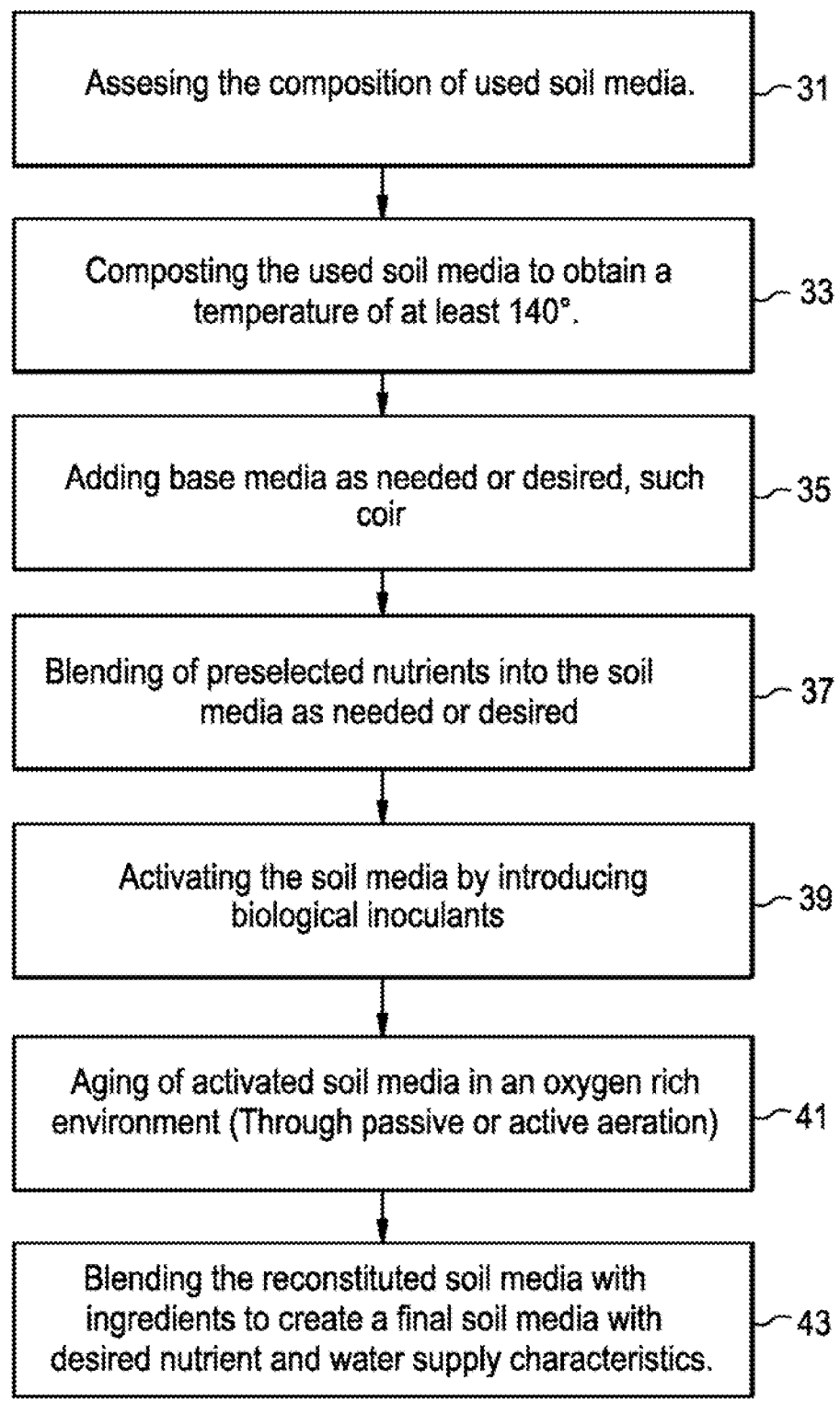
FIG. 6 is a flow chart of a second process for recharging used soil or horticulture media for reuse as a growth medium.

II. Recharging Used Soil or Horticulture Media:

In another aspect of the invention used soil or horticulture media is recharged and reformulated for use again. Used soil or horticulture media can provide a base for the creation of reusable soil or horticulture media using a modified version of the present invention. FIG. 6 provides a flow chart of the overall process used in the present invention for recharging used soil or horticulture media. The first step 31 is to assess the composition of the used soil or horticulture media, in another step 33. In step 33 the soil or horticulture media is composted with the objective of obtaining a temperature during the composting process of at least 140 degrees Fahrenheit to kill unwanted plant life, weed seeds and pests and pathogens.

After the composting step the method of creating new soil or horticulture media discussed above and outlined in FIG. 1 is followed with some modifications. Referring to FIG. 6 additional base media, such as coconut coir, can be added as needed to achieve desired consistency and porosity of the media step 35. Additional nutrients can also be added as needed, step 37. To assure activation of the aging process one can add an inoculant step 39, such as worm castings or new soil or horticulture media which has been created with the method outlined in FIG. 1 and discussed above. Referring to FIG. 6 again the aging process step 41 is conducted as discussed above with the objective of keeping it an aerobic process. In the final step 43 additional nutrients, base media or other additives can be blended into the reconstituted soil or horticulture media to create the final media with desired nutrient, air flow and water supply characteristics. It should be noted that the order of the steps of the process outlined in FIG. 6. The order of the steps can be varied without departing from the spirit of the invention.

a. Assessing the Composition of the Used Media:

The first step 31 is the determination of the composition of the subject used soil or horticulture media. The process of recharging the used soil and its recharging is also dependent on what the desired use for the used soil is. During this step the physical, biological and chemical characteristics of the used soil or horticultural media can be determined. There are many ways to assess the physical, biological and chemical characteristics of soil or horticulture media. Too many to itemize here. The characteristics and measuring techniques discussed in the following paragraphs are offered only a few of the possible examples of possible ways to measure the characteristics of the soil or horticulture media.

Physical characteristics measured can include the bulk density of the soil or horticulture media (mass per unit volume). This can be measured using widely established procedures and compared to defined thresholds. An important physical criterion is total porosity of the horticultural media and the portion that will drain under gravity after the soil is saturated.

Chemical characteristics are also measured by these include the soil pH and the nutrient supplying characteristic of the media. In a nutrient dense horticultural media the challenge is to predict the potential of the horticultural or soil media to supply nutrients over time. This represents a challenge because standard measures such as the widely adapted saturated media extract procedure provides a point in time measurement of nutrients in soil solution. However in a nutrient dense soil a measure of the potential to release nutrients due to the mineralization (breakdown) of organic materials is required.

In this invention we compare measured nutrient release from used horticultural media against target profiles and amend with nutrient containing materials as required. In one variation samples of the media may be leached with pure water (prepared by distillation, deionization, reverse osmosis or similar process) or a dilute salt solution such as potassium chloride (KCl) or potassium sulphate ($K_2SO_4$) to create a baseline, the material can then be incubated over a period of time (days to weeks) at a standard temperature and moisture content and the nutrients mineralized can be determined by measuring nutrients released in a subsequent leaching. In another variation nutrients released may be recovered using anion or cation exchange resins.

b. Reprocessing of Used Media:

At some point the used soil is composted 33 to sterilize and purge it of pests, pathogens or disease in the soil. The composting is typically raises the temperature to at least 140° F. or more. Any number of different composting methods can be used. The important aspect of this step is that the temperature is equal to or exceeds that needed to kill pathogens, weed seeds and other undesirable items in the used soil or horticulture media. Use of the media to grow plants or for other purposes can easily have introduced undesirable items. During this composting step the fact that it turns anaerobic is not of concern. Purging the used growth media of unwanted items such as pathogens, weed seeds and other undesirable items is important. FIGS. 4, 7 and 8 depict three different methods that can be used to compost the used media to sterilize the used media. The primary difference from that used in creating the new media described above is the aeration and temperature control has a different. For example achieving and maintaining an adequate sterilization temperature to control pathogens is required and air flow may be modified to achieve the desired process conditions with the rotary system of FIG. 7 or vessel of FIG. 4 may be as few as three days. On the other hand using the windrow method it can take up to 15 days of maintaining the necessary anaerobic process for sterilization. In the preferred embodiment at least a temperature of 140° F. is necessary.

c. Adding More Base Media:

Once the physical characteristics of the growth media are assessed and it is composted to eliminate unwanted pathogens, weed seeds and other undesirable items there may be a need to adjust them to meet the new use envisioned for it or to prepare for the next steps in the recharging process. One of the aspects that may be adjusted is the porosity of the growth media. There may be a need to adjust it to meet air and water porosity requirements. The aspect of porosity and related issues was discussed extensively above at I. b. Preparing the Base Media and is applicable to this step. It may not be necessary to add base media material, such as coir at this step if the used growth media meets the requirements at this point.

d. Adding Nutrients:

Once the soil is assessed and a profile of the physical, chemical and biological characteristics of the soil is determined the option of adding nutrients is considered. In most instances there will be a need to do this. Although it is conceivable that this might not be necessary in some rare cases. In any event the step of adding nutrients is exactly the same as that described at I. c. Adding Nutrients above.

e. Injecting Inoculants:

At this step if necessary an inoculant is added, as discussed above at I. d. such as worm casting or horticulture or soil media prepared by the process outlined in FIG. 1. The intent being to initiate the aging or curing process.

f. Aging:

The aging process conducted in the process of recharging soil is the same as that discussed at I. e. Aging the Media, above.

g. Blending in Additional Ingredients:

The step of blending in additional ingredients to tailor the recharged horticulture media or soil media is essentially the same as that discussed at I. f. Fine Tuning the Media, above. This may happen before, after or during the aging process.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

I claim:

1. A biologically active nutrient dense plant growth media comprising:
    a. a mixable base media having a combined water and air porosity;
    b. nutrients;
    c. wherein said base media and said nutrients are processed by:
        i. introducing biological inoculants to form an active media;
        ii. aging the active media in an oxygen rich environment such that biological aerobic activity is maintained; and
        iii. blending in additional ingredients so as to create a plant growth media tailored with nutrient, pH, carbon, air supply and water supply characteristics.

2. The plant growth media claim 1 wherein said base media is coconut coir of at least one particle size to thereby create a loose base media.

3. The plant growth media of claim 1 wherein said base media has a particle size of from less than 0.05 mm to more than 12.5 mm in diameter.

4. The plant growth media of claim 1 wherein said base media is made up of one or more materials selected from a group consisting of coconut coir, sphagnum moss, pine bark, rice hulls, wood chips, wood mulch, sawdust, molasses, corn stover, wheat straw, barley straw, spent brewers grains, perlite, vermiculite and, sand.

5. The plant growth media of claim 1 wherein said nutrients and said additional ingredients includes one or more of substances selected from a group consisting of: nitrogen, phosphorous, potassium, animal and plant derived protein meals, mineral trace elements, azomite, greensand, soluble humic and fulvic acids, poultry litter, diatomaceous earth, epsom salt, gypsum, humates, peanut meal, phosphate rock, soft rock phosphate, sodium nitrate, sulphate of potash, alfalfa meal, peanut meal, cottonseed meal, rye grass, neem meal, corn forage, green manures, clover, buckwheat, vetch, mustard, oil seed rape, kelp meal, feather meal, fish hydrolysate, blood meal, bone meal, bat and seabird guanos, langbenite, calcitic lime, dolomitic lime, ferrous sulfate, aluminum sulphate, urea, ammonium nitrate, ammonium sulphate and sulphur.

6. The plant growth media of claim 1 wherein the step of aging the active media in an oxygen rich environment uses a passive method of aeration.

7. The plant growth media of claim 1 wherein the step of aging the active media in an oxygen rich environment involves the step of actively aerating when the temperature of the active media during the aging step is 110 to 180 degrees Fahrenheit or more.

8. The plant growth media of claim 1 wherein the step of aging in an oxygen rich environment involves the step of actively aerating the active media.

9. The plant growth media of claim 1 wherein the step of introducing an inoculant is selected from a group consisting of: introducing worm castings, introducing plant growth media previously made with this method, and introducing soil.

10. The plant growth media of claim 1 comprising the further step of monitoring the oxygen content of the aging active media and injecting additional oxygen if the level monitored falls below a threshold necessary to maintain an aerobic aging process.

11. The plant growth media of claim 1 wherein said water porosity can vary from 10% to 50% and said air porosity can vary from 10% to 50% and total combined porosity can vary from 10% to 90% depending on the combination of air and water porosity.

12. The plant growth media of claim 1 including a step of adding biochar as an ingredient.

13. The plant growth media of claim 8 wherein the step of actively aerating comprises a step selected from the group consisting of: inserting air conduits into the active media and blowing air into the active media, and turning or mixing of the active media.

14. The plant growth media of claim 13 wherein the step of turning or mixing the active media comprises a step selected from a group consisting of: turning or mixing the active media in a vessel using an auger, turning or mixing the active media in windrows using a commercial windrow machine, turning or mixing the active media in piles using equipment such as a front end loader, turning the active media using rotary processing equipment, or turning the active media using a rotary composter.

15. A recharged used growth media for plant propagation produced according to a process comprising the steps of:
    a. assessing the composition of used growth media for physical, chemical and biological characteristics;
    b. composting the used growth media to obtain a temperature for a period of time sufficient to sterilize the growth media;
    c. adding base media to create a specific air and water porosity;
    d. blending nutrients into the growth media;
    e. activating the growth media by introducing at least one biological inoculant;
    f. aging the activated growth media in an oxygen rich environment to assure a purely aerobic aging process is maintained; and
    g. blending into the growth media additional nutrients and ingredients so as to create a plant growth media tailored with nutrient and water supply characteristics, to create a new recharged growth media.

16. The recharged growth media of claim 15 wherein said used growth media is selected from a group consisting of horticulture media, potting soil, and soilless media.

17. The recharged growth media of claim 15 comprising an additional step of adding organisms to the growth media to remove deleterious matter and deleterious_organisms.

* * * * *